May 30, 1961

A. L. M. A. ROUY 2,986,066

POLARIMETRIC APPARATUS

Filed Oct. 15, 1957

AUGUSTE LOUIS MARIE ANTOINE ROUY
INVENTOR.

BY
Rudolph J. Gurich
ATTORNEY

May 30, 1961

A. L. M. A. ROUY 2,986,066

POLARIMETRIC APPARATUS

Filed Oct. 15, 1957

AUGUSTE LOUIS MARIE ANTOINE ROUY
INVENTOR.

BY Rudolph J. Lurick
ATTORNEY

United States Patent Office 2,986,066
Patented May 30, 1961

2,986,066

POLARIMETRIC APPARATUS

Auguste Louis Marie Antoine Rouy, Scarsdale, N.Y., assignor, by mesne assignments, to Daystrom, Incorporated, Murray Hill, N.J., a corporation of New Jersey Filed Oct. 15, 1957, Ser. No. 690,396

15 Claims. (Cl. 88—14)

This invention relates to a method and apparatus for polarimetric analysis and more particularly to improved arrangements for determining the angular rotation of the plane of polarization of a polarized light beam by a substance interposed in the light beam.

In my co-pending United States patent application Serial No. 690,395, filed October 15, 1957, and entitled Apparatus and Method For Polarimetric Analysis I disclose novel methods for determining the extent of the angular rotation of a polarized light beam as it traverses a substance under test. Briefly, such method comprises passing a polarized light beam through the substance and then through a light-polarizing member, or analyzer, having a known plane of light polarization. Prior to its entrance into the substance under test, the plane of polarization of the light beam is modulated within an angular range defined by known and opposite angles taken with respect to the plane of light polarization of the analyzer. The resulting variations in the energy of the light beam emerging from the analyzer are converted by a suitable light transducer, such as a photoelectric cell, into corresponding electrical variations. These electrical variations, by reason of the modulated character of the light beam, consists of A.C. and D.C. components. In such co-pending patent application, means are disclosed for measuring such A.C. and D.C. output components of the light transducer. The D.C. component is proportional to the sum of the light energies arising by reason of the shifting of the plane of polarization of the light beam in one and the other directions relative to the reference axis defined by the polarization plane of the analyzer. On the other hand, the A.C. output component corresponds to the difference of such light energies. The ratio of the A.C. to D.C. output components is a measure of the extent of angular rotation of the polarized light beam by the substance under test.

The present invention is directed to various light-reflecting arrangements for producing the polarization modulation of the light beam, which arrangements are adapted for the direct measurement of the extent of optical rotation of a light beam by a substance traversed by the light beam, as well as for comparing the extent of such rotation of an unknown substance against a known substance.

An object of this invention is the provision of novel polarimetric apparatus utilizing means for modulating the plane of polarization of a polarized light beam thereby not only facilitating a determination of the angular rotation of the light by a substance under test, but also affording a high degree of sensitivity and precision.

An object of this invention is the provision of a method of polarimetric analysis, which method comprises alternately directing a light beam in two distinct paths, polarizing the light beam as it traverses one path along a known plane of polarization, passing the polarized light beam through a substance under test and then through an analyzer whose plane of light polarization forms an angle with respect to the polarized plane of the light beam, the energy of the light beam emerging from the analyzer being taken as indicative of the angular rotation of a polarized light beam by the substance.

An object of this invention is the provision of apparatus for polarimetric apparatus comprising a light beam directed through a substance under test and through an analyzer having a known plane of light polarization, a pair of light polarizers which, respectively, have their planes of light-polarization oriented at known and opposite angles with respect to the plane of polarization of the analyzer, and means for alternately directing the light beam through one and the other of the pair of light polarizers, and means responsive to the energy of the light beam emerging from the analyzer.

An object of this invention is the provision of polarimetric apparatus comprising means forming a light beam, means polarizing the light beam in a known plane of polarization, means for alternately directing the polarized light beam in two distinct paths, means interposed in at least one such light path and rotating the light beam traversing the associated path, means directing the light from each path through a substance under test and through an analyzer having its plane of polarization oriented at a known angle with respect to the said first means polarizing the light beam, and means translating the light beam emerging from the analyzer into corresponding electrical variations.

An object of this invention is the provision of polarimetric apparatus comprising means forming an initial light beam, a first light-polarizing member disposed in the light beam and polarizing the beam in a known plane, means alternately directing the polarized light beam in two distinct paths, a known solution traversed by the light beam directed in one of said paths, an unknown solution traversed by the light beam directed in the other path, light rotating means interposed in the said other path, means directing the light beams from both of the paths through a second light polarizing member having its plane of light-polarization oriented at an angle relative to the plane of polarization of the said first light-polarizing member, and means responsive to the energy of the light beam emerging from the second light-polarizing member.

These and other objects and advantages will become apparent from the following detailed description when taken with the accompanying drawings, illustrating several embodiments of the invention. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
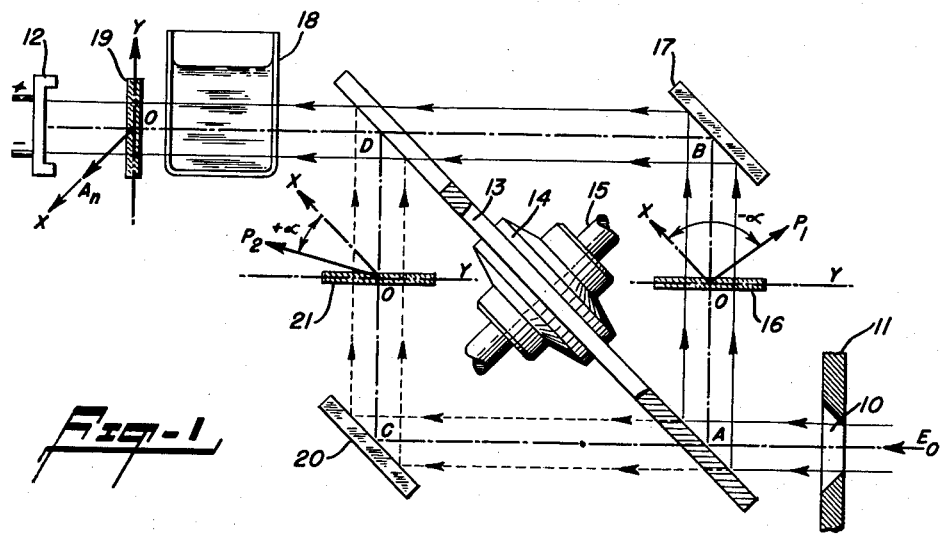
Figure 1 is a digrammatic representation of apparatus made in accordance with one embodiment of this invention.
Figure 2:
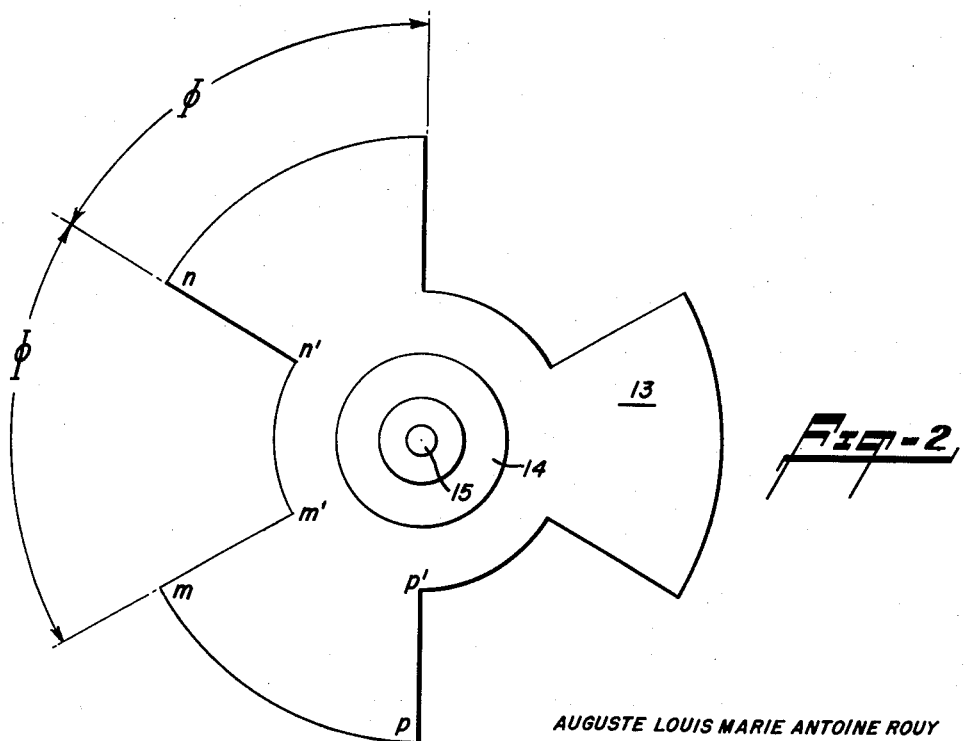
Figure 2 is a plan view of the rotatable, light-reflecting disc.

Reference now is made specifically to Figures 1 and 2. A substantially parallel light beam $E_0$ passes through an opening, or window, 10 provided for this purpose in the screen 11. The light beam in its progression toward the light transducer 12 may follow either one of the two paths, ABD or ACD, depending upon the angular position of the rotating disc 13 shown in plane projection in Figure 2. This disc, which may be made of a suitable metal, is provided with segmental cut out portions, such as that defined by the letters $mnn'm'$, thereby providing radially-extending fins or sectors such as that identified by the letters $mm'p'p$. The angular extent of the fins and cut out portions are equal, corresponding to the angle $\phi$ such that $N\phi=2\pi$, where N is an even integer. Both surfaces of the disc fins are mirror polished and planoparallel. A central hub 14, securely keyed to the rotating shaft 15, carries the disc which is caused to rotate at constant speed by means of an appropriate small electric motor, not shown.

When the disc 13 is in the position illustrated in Figure 1, the light beam is reflected by the disc surface at the point A and travels in the direction AB, traversing the light polarizing member, or polarizer, 16 whose plane of light polarization $P_1$ is oriented at an angle $-\alpha$ with respect to the reference axis OX, such reference axis being perpendicular to the direction of the axis of light beam traversing the polarizer. At B, the front surface of the plano mirror 17 reflects the light beam along the direction BD which is also the main axis of the instrument on which the container 18, the analyzer 19, and the light transducer 12 are centered. At the point D, the light passes unobstructed through the cut out segment of the disc 13.

On the other hand, when a cut out segment of the disc reaches the position A due to the rotation of the reflecting disc, the light beam passes along the direction AC parallel to BD. At the surface C, another reflecting plano mirror 20 reflects the beam in the direction CD parallel to the direction AB and causes the light beam to traverse a second polarizer 21 whose plane of polarization $P_2$ makes the angle $+\alpha$ with the reference direction OX. Arriving at the position D this light beam is reflected along the general direction BD by the light-reflecting fin of the disc, it being apparent that when a fin occupies the position A a cut out section will occupy the position D and vice versa. It will be noted that the angles at which the polarizers 16 and 21 are oriented with respect to the reference axis are equal in absolute value but opposite in sign.

Whatever may be the path of the light ABD or ACD the total length of the light path remains unchanged and the light beam reaching the sensitive surface of the light transducer element remains unchanged with respect to space distribution. In other words, if the light beam forms an image of the light source on the sensitive surface of the transducer, this image cannot be affected in its position or dimension by the change of light path.

With a single cut out disc the number of cut out portions ($mnn'm'$) must be equal to an entire odd number. Naturally, the single disc can be replaced by two separate discs of similar design one acting at the point A the other at the point D with their shafts being gear driven to establish the necessary synchronization to properly match together a reflecting segment with a cut out.

The plane of polarization $A_n$ of the analyzer 19, which also is a light-polarizing member, is oriented to coincide with the reference axis OX. It will be apparent, therefore, that the polarizer 16 polarizes the traversing light beam to a plane oriented at an angle of $-\alpha$ relative to the plane of polarization of the analyzer 19, whereas the polarizer 21 orients the plane of light polarization of its traversing light beam at an equal but opposite angle $+\alpha$ with respect to the plane of polarization of the analyzer. Thus, as the disc 13 rotates, two beams of light alternately traverse the test solution contained in the container 18, such beams of light being shifted in positive and negative directions with respect to the polarizing plane of the analyzer 19. This results in a corresponding modulation of the light beam emerging from the analyzer and striking the active surface of the light transducer 12. The light transducer converts such light energy variations into corresponding electric current variations which can be measured or utilized for alarm and/or control purposes.

By reason of the modulated character of the light beam traversing the test solution and the analyzer, the output current variations of the light transducer include both D.C. and A.C. components. In my above-referenced copending United States Patent application Serial No. 690,395, I disclose methods and means for measuring both the A.C. and D.C. output components of the light transducer, the ratio of which is taken as indicative of the extent of optical rotation of the plane of polarization of a polarized light beam by a solution traversed by the light beam. The precise determination of such optical rotary power of a solution yields valuable information concerning its chemical analysis and, in fact, molecular structure.

Figure 3:
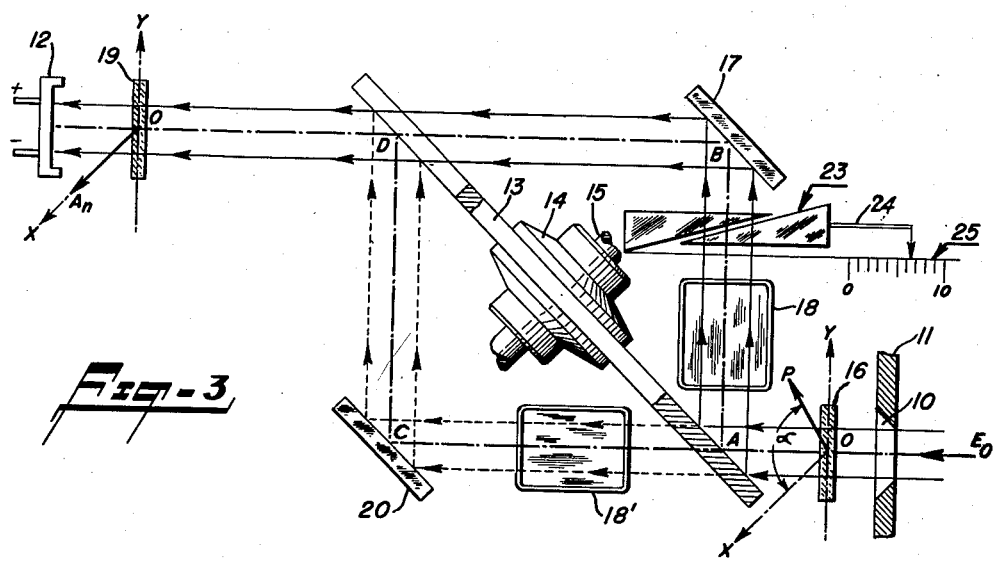
Figure 3 is a diagrammatic representation of apparatus made in accordance with another embodiment of the invention.

In practice, it is often necessary to compare the optical rotary power of an unknown solution against a standard of known concentration. An arrangement for this purpose is shown in Figure 3. Here, two containers 18, 18' are placed conveniently and respectively on the light trajectories AB and AC. A single polarizer 16, placed close to the entrance window of the screen 11, polarizes the entering light beam $E_0$ along the direction OP making the selected angle $\alpha$ with the reference axis OX. Upon rotation of the disc 13, the polarized light beam follows either one of the two possible paths ABD or ACD before traversing the analyzer 19 and then striking the light transducer 12. As in the Figure 1 embodiment of the invention, the analyzer 19 and the light transducer 12 are disposed on the axis BD. In the Figure 3 arrangement, the A.C. component of the light transducer output current is proportional to the differences of the angles of optical rotation caused by the optically active chemicals present in the two containers 18, 18'. Suitable means may be utilized to measure such A.C. output components of the light transducer whereby the difference of angular rotation of the two solutions can be read directly from a calibrated scale.

In Figure 3, there is shown an optical wedge 23 made of either dextrogyre or levogyre quartz plates. If it be assumed that the container, or vessel, 18 contains the standard known solution, such solution can be replaced by the wedge 23. The wedge is provided with an affixed pointer 24 movable along a scale 25 calibrated in equivalent angular degrees. The relative positions of the two quartz plates, forming the wedge 23, can be adjusted so that the light beam in the path ABD will be rotated a selected angular extent as indicated by the position of the pointer 24 relative to the scale 25. If, now, the wedge 23 is adjusted so that the A.C. component of the light transducer output is zero, the angular rotation $\theta$ of the unknown solution will be the sum of the rotation caused by the standard solution plus the rotation caused by the wedge, the latter being read directly from the scale 25. On the other hand, if the standard solution is removed from the container 18, the angular rotation of the light beam by the unknown solution is measured by setting the wedge 23 to make the A.C. component of the light transducer output equal to zero. Still further, the standard solution may be placed in the container 18' and the known solution in the container 18. In this case, the extent of rotation of the light beam by the unknown solution is the difference between the rotation caused by the known solution and the setting of the wedge required to reduce the A.C. output component of the light transducer to zero value. It will also be apparent that the single polarizer as shown in Figure 3 may be replaced by two polarizers as shown in Figure 1. The only requirement prevailing in all cases is that the entrance surface of each container be disposed at equal distances from the light source.

Figure 4:
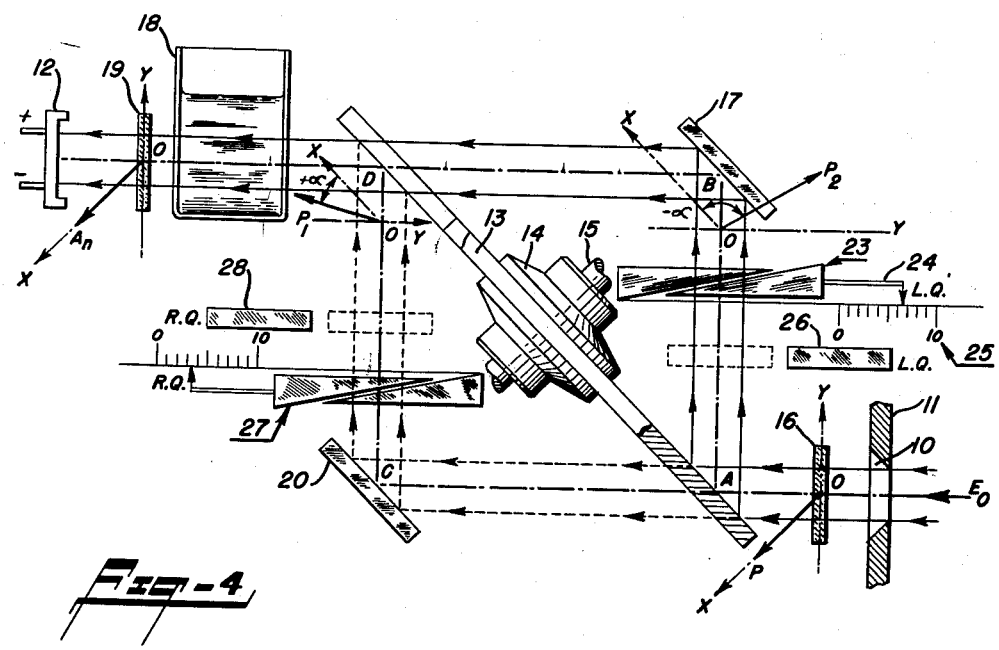
Figure 4 is a similar view showing still another embodiment of the invention.

Reference is now made to Figure 4, which is similar to Figure 1, in that the two light beams are alternately passed through a solution under test (contained in the vessel 18) but which utilizes a single polarizer 16 in combination with optical wedges along the general approach presented by the Figure 3 arrangement. The Figure 4 system operates on the basis of alternately shifting the light path either to the trajectory ABD or ACD by means of the rotating mirrored disc 13. The light polarized along the axis of reference OX by the polarizer 16 traverses the adjustable wedge 23 made, in this case, of levogyre quartz plates. The direction of the polarization axis rotates as the beam traverses the wedge and takes the position $OP_2$ making the angle $-\alpha$ with the reference axis OX. The angular displacement $-\alpha$ may be varied at will by a suitable adjustment of the wedge, the extent of such adjustment being indicated by the position of the pointer 24 relative to the calibrated scale 25. A plano parallel levogyre quartz plate 26, whose thickness is slightly less than the maximum thickness of the wedge 23, can be arranged for introduction into the light beam to increase the range of possible adjustment of the wedge.

When the disc 13 rotates one sixth of a revolution, the light polarized along the reference axis OX by the polarizer 16, strikes the mirror 20 and is reflected to traverse a second adjustable wedge 27 made of dextrogyre quartz plates. After passing through the wedge 27, this beam is rotated so that its plane of polarization takes the position $OP_1$ making the angle $+\alpha$ with the reference axis OX. Associated with the wedge 27 is a plano parallel dextrogyre quartz plate 28 of equal thickness to the quartz plate 26 and insertable into the light beam to increase the range of adjustment of the wedge 27.

The plane of polarization $OA_n$ of the analyzer 19 coincides with the reference plane OX. It will be apparent, therefore, that rotation of the disc 13 results in a modulated light beam passing through the solution under test and through the analyzer, the range of modulation being equal to the angles $+\alpha$ and $-\alpha$ to either side of the analyzer polarization plane $OA_n$. The resulting current output of the light transducer is treated as disclosed in my above-referenced co-pending application. Such output current may be measured for purposes of determining the optical rotary power of a solution or may be used for alarm and/or control purposes in continuous stream analysis.

From the above description of the several illustrated embodiments of my invention, it will be clear that the polarimetric methods and apparatus utilize the direction of a light beam alternately along two distinct paths. At least the light beam traversing one of the paths is polarized along a plane forming a known angle with respect to the plane of polarization of an analyzer. The polarized light beam is caused to traverse the solution under test and then the analyzer and the light beam emerging from the analyzer is converted into a corresponding electric current for measurement, alarm, or control purposes.

Having now given a detailed description of the invention, those skilled in this art will find no difficulty in making changes and modifications in the disclosed arrangements in order to adapt the method and apparatus to specific applications. It is intended that such changes and modifications may be made without departing from the scope and spirit of the invention as set forth in the following claims.

I claim:

1. A method of determining the rotation of the plane of polarization of a polarized light beam by a substance which method comprises alternately directing a light beam along two paths of equal length, polarizing the light beam in one path in a plane forming a known positive angle with respect to a reference plane, polarizing the light beam in the other path in a plane forming a known negative angle with respect to the reference plane, and directing the light beam from each path along a common axis through a substance under test and through a light-polarizing member whose plane of light polarization corresponds to the said reference plane, the energies of the light beams emerging from the said light-polarizing member being taken as indicative of the extent of rotation of the polarization plane of a polarized light beam by the substance.

2. A method of determining the rotation of the plane of polarization of a polarized light beam by a substance which method comprises passing a substantiallly parallel light beam from a light source through a substance under test and through a light-polarizing member whose plane of light polarization lies in a fixed reference plane, alternately directing the light beam along two equal paths which merge along a common axis prior to its entrance into the substance, and polarizing the light beam traversing each path into planes forming known but opposite angles with respect to the said reference plane, the energies of the light beams emerging from the said light-polarizing member being taken as indicative of the extent of rotation of the polarization plane of a polarized light beam by the substance.

3. A method of determining the rotation of the plane of polarization of a polarized light beam by a substance which method comprises polarizing a light beam in a known plane of polarization, alternately directing the polarized light beam in two paths of equal length, rotating the light beam traversing each path to a known but opposite angular extent relative to the initial plane of polarization of the light beam, and directing the light beam from each path along a common axis through a solution under test and through a light-polarizing member whose plane of polarization coincides with the initial plane of polarization of the light beam, the energies of the light beams emerging from the said light-polarizing member being taken as indicative of the extent of rotation of the polarization plane of a polarized light beam by the substance.

4. A method of comparing the rotation of the plane of polarization of a polarized light beam by an unknown substance to a known substance which method comprises forming a light beam polarized in a known plane of polarization; alternately directing the polarized light beam along two paths of equal length, one path including the known substance and the other path including the unknown substance; rotating the light beam in one of the paths a known angular extent, and passing the light beams from each path along a common axis through a light-polarizing member whose plane of polarization forms a known angle with reference to the plane of polarization of the polarized light beam, the energies of the light beams emerging from the said light-polarizing member being taken as indicative of the difference in the extent of rotation of the polarization plane of a polarized light beam between the two substances.

5. The method of determining the difference in the extent of rotation of the polarization plane of a polarized light beam by two substances which method comprises polarizing a light beam in a known plane of polarization, alternately directing the light beam along two paths of equal length each of which includes one of the substances, directing the light traversing each path along a common axis and through a light-polarizing member whose plane of polarization coincides with that of the polarized light beam, rotating the light beam traversing one of the paths a known angular extent, the extent of such rotation of the light beam traversing one path being the difference in the extent of rotation of the polarization plane of a polarized light beam by the two substances when the ratio of the energies of the light beam emerging from the said light-polarizing member is a predetermined value.

6. In a polarimetric apparatus the combination of means forming a light beam, means alternately directing the light beam along two paths of equal length, means polarizing the light beam as it traverses the two paths in predetermined planes of polarization, means directing the light beam from both paths along a common axis and through a fixed light-polarizing member whose plane of polarization is oriented at a predetermined angle with respect to that of the polarized light beam traversing the two paths, and means responsive to the energy of the light beam emerging from said fixed light-polarizing member.

7. The invention as recited in claim 6 wherein the means polarizing the light beam as it traverses the two paths comprises a first light-polarizing member disposed in one path and having its polarizing plane oriented at a known positive angle with respect to that of the fixed light-polarizing member, and a second light polarizing member disposed in the other path and having its polarizing plane oriented at a known negative angle with respect to that of the fixed light-polarizing member.

8. The invention as recited in claim 7, wherein each light path includes reflecting means directing the light traversing each path along the said common axis.

9. Polarimetric apparatus comprising means forming a substantially parallel light beam; a rotatable disc having an odd number of spaced, radially-extending fins whose circumferential length is equal to that of the spaced opening between fins; light-reflecting coatings on the surfaces of the fins; means mounting the disc for rotation in a plane offset with respect to the axis of the said light beam such that the fins intersect the light beam upon rotation of the disc resulting in alternately directing the light beam along two distinct paths of equal length; means polarizing the light beam as it traverses th two paths in predetermined planes of polarization; means directing the polarized light beam from each path along a common axis and through a third light-polarizing member having its polarizing plane oriented at a known angle with respect to that of the polarized light beams traversing the two paths; and means responsive to the energy of the light beam emerging from the third light-polarizing means.

10. Polarimetric apparatus comprising means forming a substantially parallel light beam; means polarizing the light beam in a predetermined plane; means alternately directing the polarized light beam along first and second paths of equal length; means rotating the light beam traversing the first path a known positive angle with respect to that of the polarized light beam; means rotating the light beam traversing the second path a known negative angle with respect to that of the polarized light beam; and means directing the light beam from each path along a common axis and through a light-polarizing member whose polarizing plane coincides with that of the polarized light beam.

11. The invention as recited in claim 10, wherein the light beams directed to the said light-polarizing member first pass through a transparent container adapted to contain a sustance under test, and including means associated with each of the light-rotating means and adjustable to control the extent of such light rotation.

12. Polarimetric apparatus comprising means forming a substantially parallel light beam; means polarizing the light beam in a predetermined plane; means alternately directing the polarized light beam along first and second paths of equal length; means rotating the polarized light beam as it traverses the first and second path within a range defined by known but opposite angles relative to the initial plane of polarization of the light beam; reflecting means in each of the paths and oriented to reflect the beam traversing each path along a common axis and through a light-polarizing member whose plane of polarization coincides with the initial plane of polarization of the light beam; and means converting the light beam emerging from the said light-polarizing member into electrical variations.

13. Polarimetric apparatus comprising means forming a substantially parallel light beam; a rotatable disc having an odd member of equally-spaced, radially-extending fins whose circumferential length is equal to that of the spacing between fins; light-reflecting coatings on the surfaces of the fins; a first light-polarizing member disposed in the light beam and having a predetermined plane of polarization; means mounting the disc for rotation in a plane offset from the axis of the polarized light beam emerging from the said first light-polarizing member such that the fins intersect such polarized light beam upon rotation of the disc resulting in alternately directing the light beam along two distinct paths of equal length; a light-rotating member disposed in one of the paths; reflecting means in each path and oriented to reflect the light beam traversing each path along a common axis and through a second light-polarizing member whose plane of polarization coincides with that of the said first light polarizing member, and a light transducer converting the light beam emerging from the second light-polarizing member into electrical variations.

14. Polarimetric apparatus comprising means forming a substantially parallel light beam; means polarizing the light beam in a predetermined plane; means alternately directing the polarized light beam along two distinct paths of equal length; means rotating the light beam a known angular extent as such light beam traverses one of the paths; a first transparent container in the said first path and traversible by the light beam as it follows such path; a second transparent container in the second path and traversible by the light beam as it follows such path; means directing the light beam from each path along a common axis and through a light-polarizing member whose plane of polarization is oriented at an angle with respect to that of the initially-polarized light beam; and means converting the light beam emerging from said light-polarizing member into electrical variations.

15. The invention as recited in claim 14, wherein the means alternately directing the light along the two paths comprises a rotatable member having spaced, radially-extending, light-reflecting fins which upon rotation of the member alternately intersect the light beam emerging from the first polarizer and the light beam striking the second light-polarizing member.

References Cited in the file of this patent

UNITED STATES PATENTS

| | | |
|---|---|---|
| 2,547,212 | Jamison et al. | Apr. 3, 1951 |
| 2,583,186 | Mueller | Jan. 22, 1952 |
| 2,731,875 | Gould | Jan. 24, 1956 |
| 2,766,652 | Stanton | Oct. 16, 1956 |
| 2,795,166 | Noskowicz | June 11, 1957 |
| 2,829,555 | Keston | Apr. 8, 1958 |
| 2,861,493 | Landegren | Nov. 25, 1958 |

FOREIGN PATENTS

| | | |
|---|---|---|
| 540,876 | Great Britain | Nov. 4, 1941 |